United States Patent
Sharma et al.

(10) Patent No.: US 12,210,840 B2
(45) Date of Patent: Jan. 28, 2025

(54) ARTIFICIAL INTELLIGENCE BASED SMART DEVICE FOR CONTACT CENTERS SOLUTIONS

(71) Applicant: Accenture Global Solutions Limited, Dublin (IE)

(72) Inventors: Kuldeep Sharma, Bangalore (IN); Santhosh Natarajan, Chennai (IN); Sandesh Hanumantharayappa, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 292 days.

(21) Appl. No.: 17/891,685

(22) Filed: Aug. 19, 2022

(65) Prior Publication Data
US 2023/0059979 A1 Feb. 23, 2023

Related U.S. Application Data

(60) Provisional application No. 63/235,524, filed on Aug. 20, 2021.

(51) Int. Cl.
G06F 3/00 (2006.01)
G06F 40/35 (2020.01)
G06N 20/00 (2019.01)
H04M 3/51 (2006.01)

(52) U.S. Cl.
CPC ............ *G06F 40/35* (2020.01); *G06N 20/00* (2019.01); *H04M 3/5166* (2013.01)

(58) Field of Classification Search
None
See application file for complete search history.

(56) References Cited

U.S. PATENT DOCUMENTS

| | | | |
|---|---|---|---|
| 11,315,571 B2* | 4/2022 | Manchireddy | G10L 15/06 |
| 2013/0268260 A1* | 10/2013 | Lundberg | G06F 11/3664 |
| | | | 704/8 |
| 2017/0068423 A1* | 3/2017 | Napolitano | G06F 3/04842 |
| 2018/0307504 A1* | 10/2018 | Aggarwal | G06F 3/167 |

FOREIGN PATENT DOCUMENTS

CN 113157878 A * 7/2021

* cited by examiner

*Primary Examiner* — Shreyans A Patel
(74) *Attorney, Agent, or Firm* — Polsinelli PC

(57) ABSTRACT

Methods, systems, and apparatus are provided for operating a contact center operation control assistant system. An oral request from a user is captured using a virtual assistant executing on a smart device. An intent of the oral request is identified using a natural language understanding (NLU) platform. A request to a contact center platform is generated by invoking an application programming interface (API) based on the identified intent. An API response is received from the contact center platform in response to the API request. The API response is packaged into a sentence and provided to the user of the smart device using the virtual assistant.

18 Claims, 11 Drawing Sheets

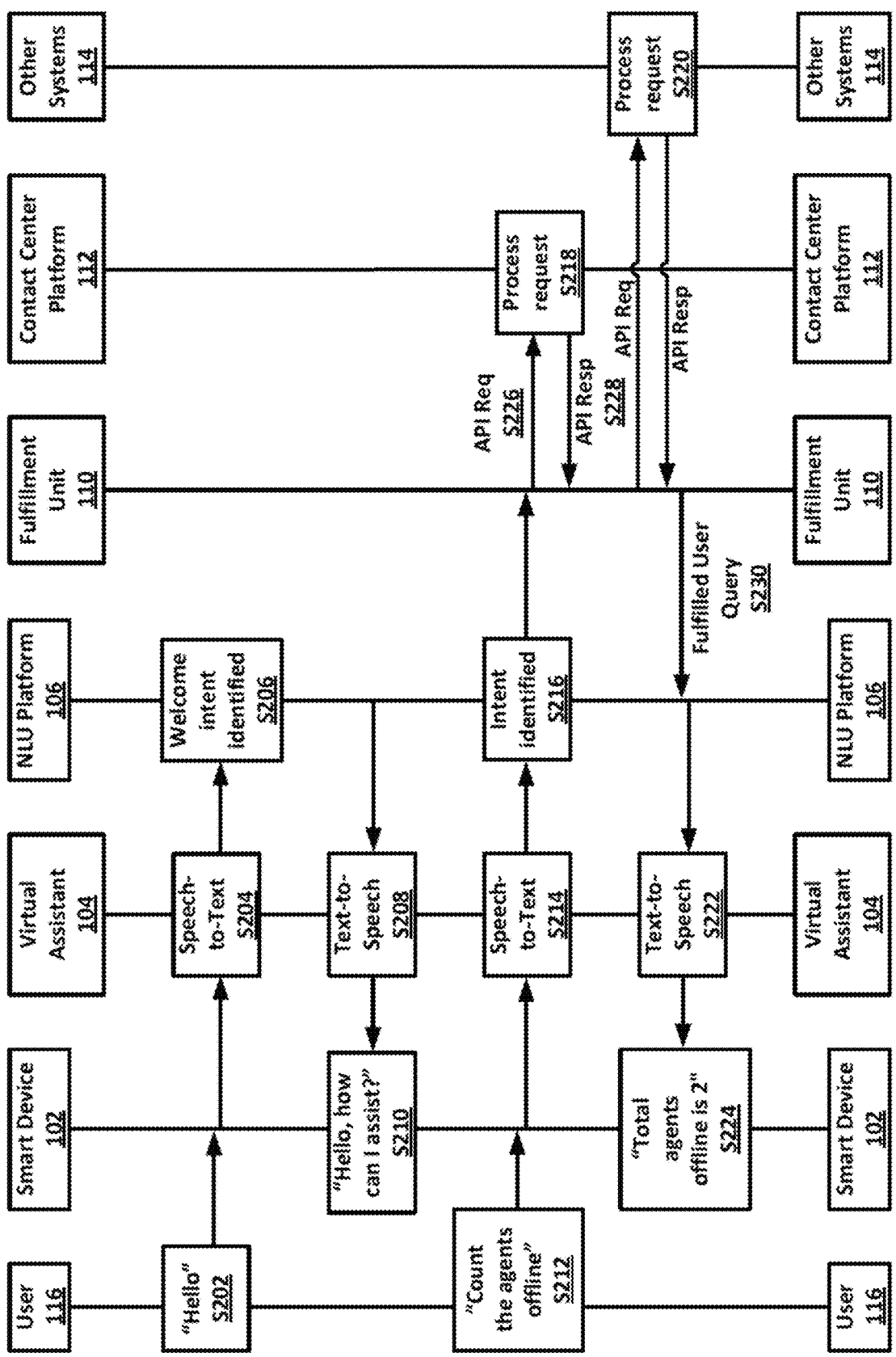

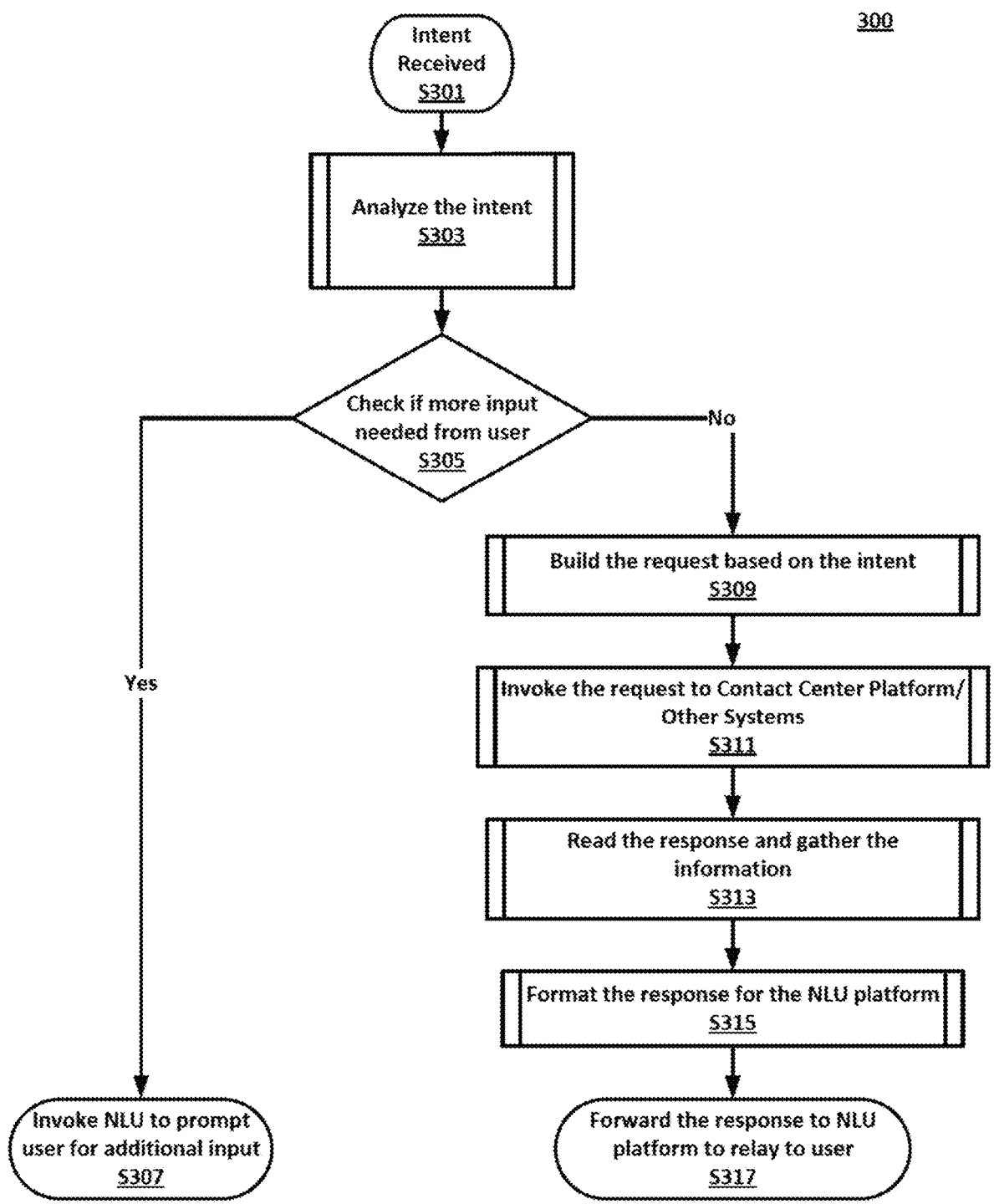

ARTIFICIAL INTELLIGENCE BASED SMART DEVICE FOR CONTACT CENTERS SOLUTIONS

CROSS REFERENCE TO RELATED APPLICATIONS

This application claims priority under 35 U.S.C. § 119 from U.S. Provisional Application No. 63/235,524, filed Aug. 20, 2021, the entire disclosure of which are herein expressly incorporated by reference.

TECHNICAL FIELD

The present subject matter generally relates to the operation and control of call or contact centers. In particular, artificial intelligence (AI)-based virtual assistants are provided for use with call or contact centers using AI-enabled smart machines and devices.

BACKGROUND

Present contact centers and call centers suffer from a variety of drawbacks, limitations, and disadvantages. Accordingly, there is a need for inventive systems, methods, components, and apparatuses described herein.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

FIG. 2A illustrates a swim lane diagram showing an example overview operation 200 of the contact center operation control assistant system 100.

FIG. 3 is an example algorithm 300 for the fulfillment unit 110 of the contact center operation control assistant system 100

DETAILED DESCRIPTION

According to some embodiments a method may be provided for operating a contact center operation control assistant system. The method may include capturing, using a virtual assistant executing on a smart device, an oral request from a user; identifying, using a natural language understanding (NLU) platform, an intent of the oral request; invoking an application programming interface (API) to generate an API request to a contact center platform based on the identified intent; receiving an API response from the contact center platform in response to the API request; packaging the API response into a sentence; and providing, using the virtual assistant, the sentence to the user of the smart device.

A successful contact center customer experience may be the key to a successful business or organization. A well-operated contact center results in satisfied customers thereby driving business success. Contact center administrators, managers, supervisors, and agents may play a vital role in driving an enriched customer experience. While some existing market tools may assist in running a contact center, they may require time-consuming and costly training on the contact center administrative staff to achieve the goal. Improvements to the performance of a call or contact center as well over all better customer experience may be achieved through use of an innovative virtual contact center assistant that may execute on a smart device.

Figure 1:
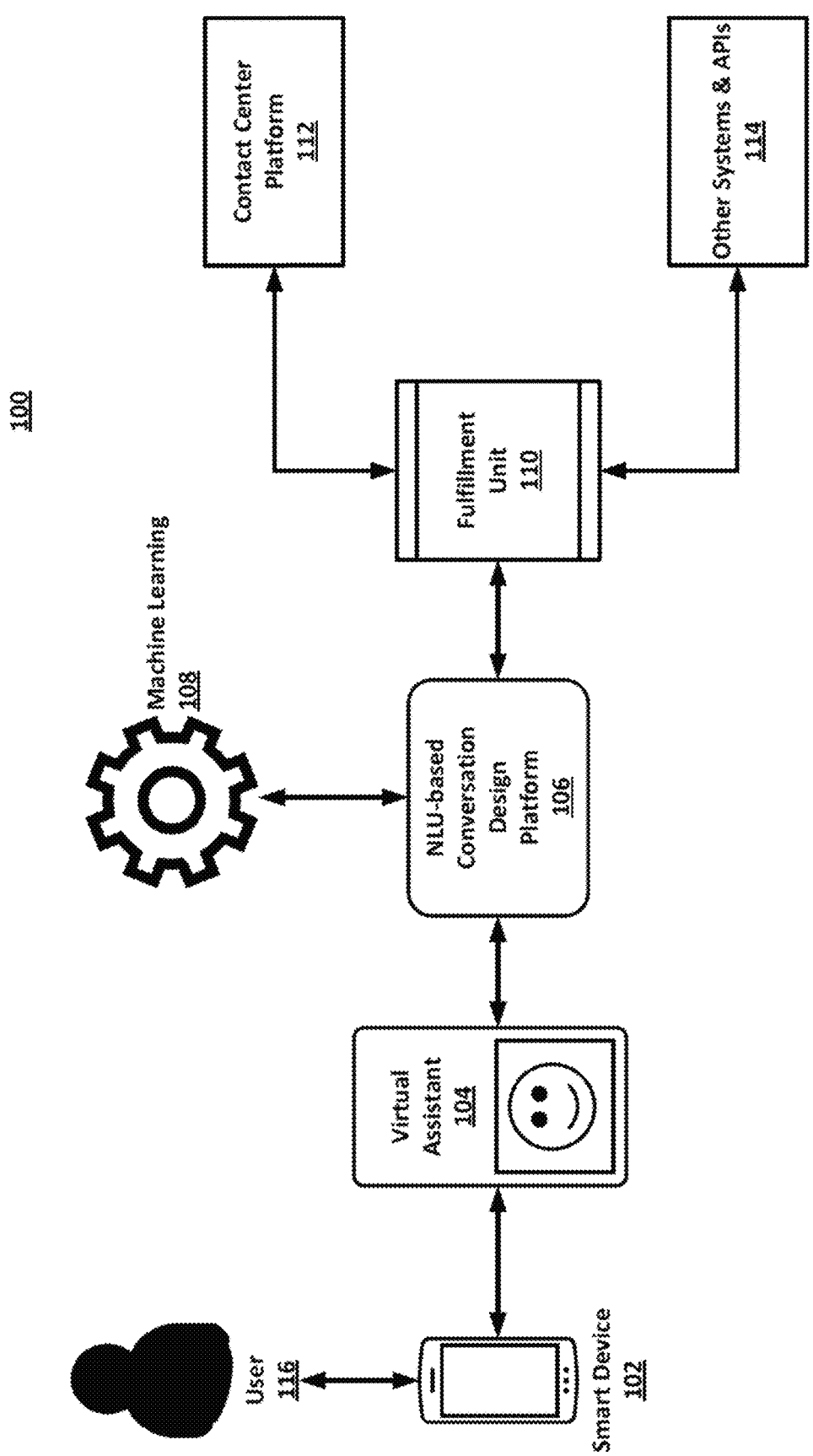
FIG. 1 illustrates an example contact center operation control assistant system 100.

FIG. 1 illustrates an example contact center operation control assistant system 100. A user 116 may interface with the contact center operation control assistant system 100 via any computing device known in the art, such as smart or smartphone-type device 102. The smart device 102 may execute a virtual assistant 104. The virtual assistant 104 may be configured to interface with a natural language understanding (NLU)-based conversation design platform 106 (NLU platform 106), which may be powered by one or more underlying machine learning models 108. The NLU platform 106 may further interface with a fulfillment unit 110, which may further be communicably coupled to a contact center platform 112 and other systems (and APIs) 114.

The smart device 102 may be a computing device including a processor and memory, wireless and/or wired network interface component, and audio recording and playback components, such as a microphone and speakers. More specifically, the smart device 102 may be a smartphone, personal digital assistant, tablet computer, laptop computer, personal computer, set-top box, and the like. Instructions operable to execute the virtual assistant 104 may be stored in a persistent, non-transitory computer-readable storage device of the smart device 102.

The virtual assistant 104 may be configured to allow smart device 102 to act as an interface to unlock the potential of handling a contact or call center. The virtual assistant 104 may execute on a processor of the smart device 102 to allow the user 116 to use his or her voice in a hands-free manner to make requests to the contact center platform 112 or other systems 114. The virtual assistant 104 may integrate with any Contact Center Platform 112 (on-premise or cloud), virtual assistant 104 clients, and other external systems 114 via the NLU platform 106 and fulfillment unit 110. The virtual assistant 104 may provide a wide array of functions in the contact center operation control assistant system 100. For instance, daily operations and control of the contact center may be performed through the virtual assistant 104. Activities such as additions of agents to queue in case of increase in workload, re-assigning the skills of agents, etc. and fetching historical details, which typically required logging in to the contact center platform 112 and other associated systems, may now be eliminated through the virtual assistant 104. This may save both time and money for organizations as managers may perform these activities remotely and quickly using a voice command by interacting with AI-enabled smart devices. This boosts the performance of the contact center platform 112 in critical situations which require immediate action. The virtual assistant 104 may assist contact center configurators, developers, and managers to perform configuration changes and enhancements to the contact center platform 112. For instance, creation of new contact center objects such as queues, agents, skills, onboarding new resources, etc. may be performed at comfort using just voice commands. Developers may leverage the capabilities of the virtual assistant 104 to perform development activities such as addition of new prompts, creation of contact center objects such as work hours tables, data tables and much more thereby enhancing the features of contact center as per business requirements. Virtual assistant 104 not only helps organizations to operate and control the contact center platform 112, it may also assist onboarding contact center workforce by assisting them in getting trained essential to perform the day to day activities and existing resources may improve their performance through coaching assigned to them. Supervisors may manage coaching by listening to call recordings and assigning training materials to agents when performance may not be satisfactory. This way both generic and personalized coaching may be assigned to agents. The virtual assistant 104 may also be interfaced with other external systems 114 apart from the contact center platform 112, such as organization onboarding platforms, learning management platforms and extended training as well as work force management capabilities of contact center. At the second layer, once approved users may be granted access, they may utilize the capabilities of the virtual assistant 104 only after authentication. Virtual assistant 104 may authenticate users through multiple methods based on business requirements and virtual assistant client capabilities. The second layer may use the below-mentioned elements or a combination of them to authenticate through possession, such as One Time Passwords (OTPs) generated by smartphone apps, OTPs sent via text or email, and/or software tokens. Alternatively, or in addition, authentication may also occur through knowledge, such as answers to personal security questions, passwords, and/or a Personal Identification Number (PIN). Alternatively, or in addition, authentication may occur through inherence, such as using voice biometrics. The virtual assistant 104 may restrict and/or offer certain features to select users based on roles and permissions. The virtual assistant 104 may ensure only authorized users are granted access. At the first layer, only approved users may be granted access to the virtual assistant 104 on their smart devices 102. Non-approved users may not be able to invoke the virtual assistant 104 through their smart devices 102. This may be done by adding the users to list who are approved to use the service of the virtual assistant 104 by a system administrator. The virtual assistant 104 may utilize the NLU platform 106 and underlying machine learning model(s) 108 to recognize the intents of the user 116 that are generally encountered and useful in managing and configuring the contact center platform 112, as will subsequently discussed The NLU platform 106 may receive textual requests from the user 116 via the virtual assistant 104. The NLU platform 106 may be designed and configured to analyze the meaning and intent of the user's 116 requests despite spelling and/or grammar mistakes. Following reception of the desired data from the fulfillment unit 110, the NLU platform 106 may prepare an audio, visual, or textual response to be conveyed via the virtual assistant 104 to the smart device 102 of the user 116. The NLU platform 106 may utilize one or more underlying machine learning models 108 to determine an intent of the user 116. For instance, the underlying machine learning model(s) 108 may be trained to recognize specific phrases and utterances based on historic requests made by users across the globe. The NLU platform 106 may be trained with accumulated, recognized phrases, which may be a combination specific keywords of the contact center platform 112 and industry/business/organization specific phrases. These recognized phrases may then be grouped, populated, and matched to intents for the NLU platform 106 to identify the user request. The training and intents to be used with the contact center platform 112 may be identified and customized based on industry experience in the field of call or contact centers. Table 1 below provides an example correspondence between one example intent "agent status," and a list of recognized phrases spoken by a user 116 that may be understood by NLU platform 106 to mean the same.

TABLE 1

| Intent | Recognized Phrase spoken by user |
|---|---|
| agents status | Agents status |
| | agents position |
| | agents availability |
| | Please check the agent status |
| | Please pick up the agent status |
| | Can you please get the agent status |
| | Please give the agent status |
| | Please tell the agent status |
| | Please get the agent status |
| | Agent indicator |

In the above example, some contact center platforms 112 may refer to the status of agents as "Agent Indicator" or "Agent Position" or Agent Position. In such cases, recognized phrases would be adjusted to meet the demands of contact center platform or any other term frequently used by specific organization/business.

The virtual assistant 104 may prompt the user 116 with a follow-up question to limit the amount of data requested from the contact center platform 112 (or other queried systems 114). In some cases, the identified intent of the user 116 may cause an amount of data to be received that may exceed a threshold in a response from the contact center platform 112, which may be unsuitable for audio playback because it would require more than a threshold amount of time to play back, would exceed a memory capacity of the smart device 102, or would exceed a data transfer time, any of which may cause the virtual assistant's response to be delayed or lost. The fulfillment unit 110 may make the determination as to whether the identified intent received from the NLU platform 106 may cause an amount of data to be received in a response from the contact center platform 112 to exceed a threshold. In this case, the virtual assistant 104 may prompt the user 116 by announcing, "Let me know the specific status you are looking for? For example, busy, available, offline, etc." or "Do you wish to know the names of Agents?", or "Do you want to know the count of Agents?". In addition, if the user 116 asks, "Can you please list the agents offline?", the virtual assistant 104 may not ask for a follow-up question seeking specific status and may instead ask for the count/names as a follow-up suggestion. In this way, the virtual assistant 104 may be configured different intents and corresponding user phrases. Table 2 below provides an example correspondence between one example intent "create agent," and a list of recognized phrases spoken by a user 116 that may be understood by NLU platform 106 to mean the same.

TABLE 2

| Intent | Recognized Phrase spoken by user |
| --- | --- |
| create agent | Add new agent |
| | Create New Agent |
| | Add New Member |
| | Add new CSR |
| | Add new Representative |
| | Create new CSR |

Training of the underlying machine learning model(s) 108 of the NLU platform 106 to recognize contact center-specific intents along with the fulfillment unit 110 may be an interesting feature of the contact center operation control assistant system 100. A list of tools that may be used and leveraged to uniquely identify the intent (mapped with contact center services) include NLU Modules (Google CCAI, Amazon Lex, Microsoft Luis, Genesys Engagement), Machine Learning Modules, Custom Java Modules, API Modules, Custom Integration Modules, and/or Cloud Services. The NLU platform 106 may be customizable to any particular type of data or system and detect multiple languages.

The machine learning model(s) 108 may utilize a supervised model as an example. In general, the machine learning model 108 may be called upon by the NLU platform 106 to receive an input voice request, analyze the voice request, search for patterns, save for reference, and provide an intent as a result. The machine learning model(s) 108 may be periodically retrained based on historic user requests to improve accuracy and continually improve performance over time. The machine learning model(s) 108 may be initially trained on phrases expected to be received from the user 116 and further add newly recognized phrases with use.

The fulfillment unit 110 may be designed to invoke any contact center platform 112 irrespective of whether it is premise, cloud, or hybrid and may make additional requests to other backend systems 114 if needed. In addition, the fulfillment unit 110 may be configured to not only generate and receive a response to a request but also to expect the next query. The fulfillment unit 110 may be developed using JavaScript to leverage the identified intents as determined by the NLU platform 106 and then call out appropriate component(s) to provide a dynamic response based on the request. The fulfillment unit 110 may also be designed to respond with a follow-up request or a suggestion to the user 116 via the virtual assistant 104 and smart device 102 based on the initial request parameters and patterns of user behavior acquired over time. The fulfillment unit 110 may have the authority to invoke third party external application programming interfaces (APIs) and retrieve data from a database, which may allow for providing more dynamic responses rather than static responses to the intent recognized by the NLU platform 106. For instance, the fulfillment unit 110 may, upon receipt of a recognized intent from the NLU platform 106, make a request for data to the contact center platform 112. Upon receiving a response, the fulfillment unit 110 may customize and format the response based on user 116 parameters, virtual assistant 104 parameters, and/or smart device 102 parameters to deliver a natural and smooth user experience. In some examples, the fulfillment unit 110 may determine, after receiving a recognized intent from the NLU platform 106, that additional information may be necessary from the user 116. In this case, the fulfillment unit 110 may, based on the recognized intent, prepare a follow-up request to the user 116, suggest additional and/or alternate requests to the user 116, amend the recognized intent to retrieve additional information that may be desired by the user 116 based on historic patterns of user behavior, and/or generate additional requests for data to the contact center platform 112 based on historic patterns of user behavior. In this way, the fulfillment unit 110 may anticipate additional data the user 116 may wish to retrieve or actions the user 116 may wish to perform based on the identified intent and historically associated other data requests and contact center platform 112 actions. For instance, the fulfillment unit 110 may recognize that a user 116 historically requests the names of available agents immediately after requesting the number of agents available. With this knowledge, the fulfillment unit 110 may request both the number of available agents and the names of those available agents from the contact center platform 112 in response to receiving only an intent to retrieve the number of available agents from the NLU platform 106.

The contact center platform 112 may be on premise, cloud, or hybrid. It may also integrate with other external systems 114 to bring in additional intelligent capabilities for the contact center. The contact center platform 112 may be monitored by tracking the real-time status of resources namely agents, remote working agents or agents working from home. Supervisors and managers may monitor the progress and as-is status of agents, queue activities and other resources remotely through the virtual assistant 104. This may ensure the contact center platform 112 is functioning as expected, and the data obtained through virtual assistant 104 may be used to make decisions and control the contact center platform 112. The virtual assistant 104 may track the status and performance of the contact center platform 112 in real time without delay.

FIG. 2A is a swim lane diagram showing an example overview operation 200 of the contact center operation control assistant system 100. In step S202, the user 116 may initialize the virtual assistant 104 by orally expressing a greeting, such as "Hello." The oral greeting may be captured by the smart device 102 and converted from speech to text in S204 by the virtual assistant 104, which may execute on a processor of the smart device 102, as previously explained. The virtual assistant 104 may pass the textual request to the NLU platform 106, which may dynamically identify the intent of the user's greeting and generate a follow-up question, which may be translated from text to speech in S208 by the virtual assistant 104 and played back on the smart device 102. In this case, the follow-up question may state, "Hello, how can I assist you?" or the like. The user 116 may then specify a request, such as "Count the agents offline" in S212. Each user request may be unique and dynamic. For example, a user may query to know the status of contact center agents in that user's queue. Another user may ask the virtual assistant to perform any contact center action, for example, to create a new skill for the agent. As used herein a "skill" refers to a new capability or configuration of a new object that may be provided as a response to a user query. A contact center skill may define what type of interactions a virtual agent will be able to handle when greeted by the user. Again, the oral request S212 may be captured by the smart device 102 and converted from speech to text in S214 such that the NLU platform 106 may dynamically identify the intent of the request. Specifically, the NLU platform 106 may utilize the speech transcription from the virtual assistant 104 and a mapping based on a stored contact/call center intent library to dynamically interpret the intent of the user's request parameters. The recognized intent may then be passed to the fulfillment unit 110, which may make appropriate (API) requests S226 to the contact center platform 112 and/or other systems 114. The contact center platform 112 and/or other systems 114 may receive and process an API request in S218 and respond in S228 with the requested data. Similarly, other systems 114 may similarly process an API request (analogous to S226) and respond accordingly (analogous to S228). The fulfillment unit 110 may then take the data of the API response S228 and prepare a formatted textual response for the user 116. In this way, it may be understood that the fulfillment unit 110 fulfills the user query in S230. The fulfilled user query S230 may be passed back to the NLU platform 106 to convert the formatted textual response to more natural textual speech. The virtual assistant 104 may then convert the textual speech to audio speech in S222, which may be played back on the smart device 102 in S224 using the speakers, headphones, and/or other attached audio devices of the smart device 102. In an example, the audio speech may provide, "Total agents offline is 2."

Figure 2B:
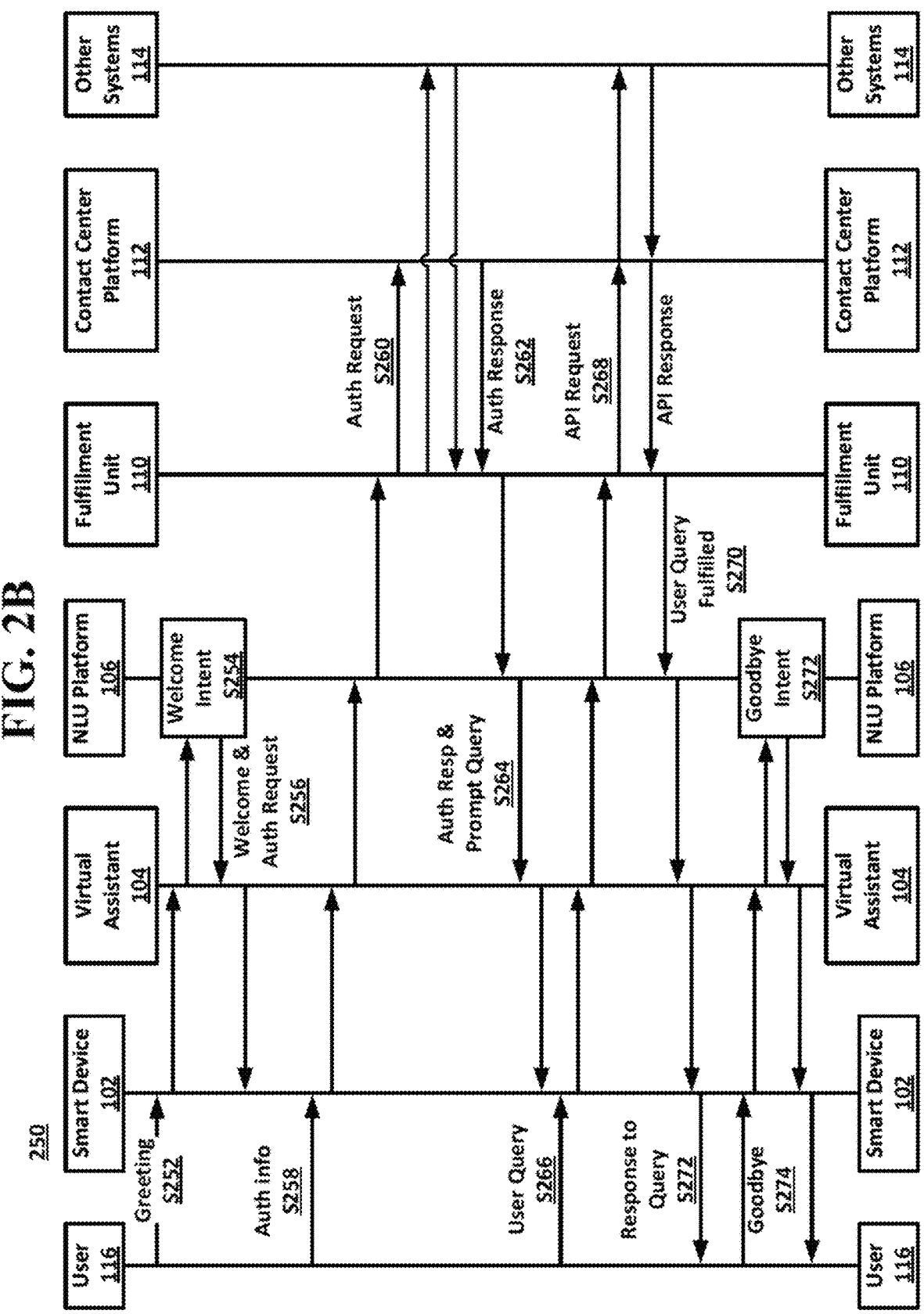
FIG. 2B illustrates a swim lane diagram showing an example overview operation 250 of the contact center operation control assistant system 100.

FIG. 2B is a swim lane diagram showing an example overview operation 250 of the contact center operation control assistant system 100 with particular attention to authentication. As in operation 200, a user 116 may orally announce a greeting in S252, which may be captured by the smart device 102 and forwarded to the virtual assistant 104. The virtual assistant 104 may convert the oral greeting of S252 to text and forward to the NLU platform 106. The NLU platform 106 may determine that the textual greeting corresponds to a greeting or welcome intent in S254 and respond with an request for user authentication request in S256. The user 116 may then provide authentication information via the smart device 102 in a variety of ways, as previously explained. For instance, the user 116 may authenticate in S258 through one-time passwords, software tokens, personal security questions PIN numbers, biometrically, such as through voice biometrics, or any combination thereof. The authentication provided in S258 may be provided to the fulfillment unit 110. The fulfillment unit 110 may then authenticate the user 116 by making (API) call(s) in S260 to the contact center platform 112 and/or analogously to other backend systems 114, such as database, active directory, voice biometrics solution, and the like. The contact center platform 112 may respond to the fulfillment unit with the authentication response S262 and/or analogously the other system(s) 114 may respond. If the authentication is not successful, then this same information may be passed to the NLU platform 106 and virtual assistant 104. Through the smart device 102, the user 116 may be notified about unsuccessful authentication in S264 and may not allowed to access the features of virtual assistant 104. In addition, in step S264, the user 116 may also be prompted to re-enter the authentication information or an alternate form of authentication. On the other hand, once the authentication is successful, the user 116 may notified of the same in S264 by relaying the message through the fulfillment unit 110, NLU platform 106, and virtual assistant 104. Additionally, in S264, the virtual assistant 104 may prompt the user 116 to input a query (e.g., "How can I help you?"). The user 116 may then query the virtual assistant 104 or request to perform some activity in S266. The intent of the user's query in S266 may be interpreted by NLU platform 106 and passed on to the fulfillment unit 110. The fulfillment unit 110, on receiving the request, may perform the desired task by triggering the appropriate API. Contact center platform 112 and associated backend systems (if applicable) may complete the action and respond back in the API response of S268, which may be packaged into a formatted response as a fulfilled user query in S270 by the fulfillment unit 110. The formatted response (i.e., fulfilled user query) may be forwarded to NLU platform 106, which may convert the response to a more natural, conversational, textual speech. For instance, the NLU platform 106 may take the "raw" response data from the contact center platform 112, such as the number of agents offline, and package the raw response data within a complete sentence, such as, "The number of agents off line is two." The virtual assistant 104 may then convert the textual speech to audio speech and confirm fulfillment/response to the query in S272 to the user 116. At any point during the interaction if an end is encountered as either defined by a condition or caused by a goodbye request (e.g., S274) the virtual assistant 104 may triggers a goodbye message.

FIG. 3 is an example algorithm 300 for the fulfillment unit 110 of the contact center operation control assistant system 100. FIG. 3 begins where the fulfillment unit 110 may receive user's intent as determined from the query by the NLU platform 106 in S301. The intent may be analyzed in S303 and compared with past, accumulated intents from users to determine whether additional information may be needed and/or whether the intent should be modified or supplemented. In S305, it may be checked whether additional input may be needed from the user 116. For instance, the fulfillment unit 110 may determine that the intent may produce an excess of response data unsuitable for audio playback on the smart device 102, which may warrant narrowing the scope of the user's query and subsequent intent. If additional input is needed, the NLU platform 106 may be invoked to prompt the user 116 for the additional input in S307. Otherwise, in S309, the request may be built based on the intent. In S311, the request may be invoked to the contact center platform 112 and/or other systems 114. The contact center platform 112 and/or other systems 114 may provide a response to the fulfillment unit 110 in S313, which may be read and subsequently formatted for the NLU platform 106 in S315. The formatted response may then be forwarded to the NLU platform 106 in S317 to relay to the user 116 via the virtual assistant 104 and smart device 102.

Figure 4A:
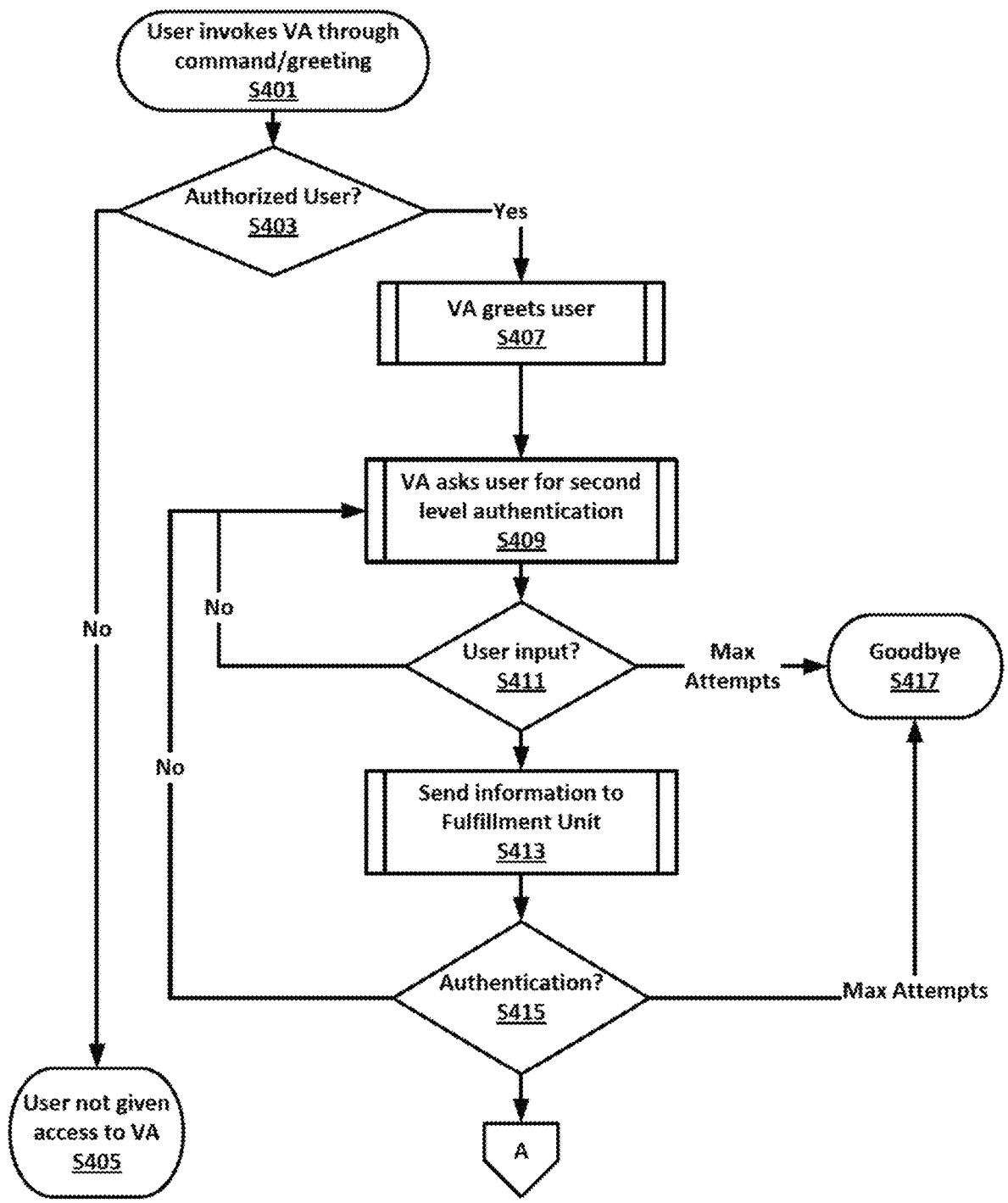
FIG. 4A illustrates an example first portion of an algorithm of the virtual assistant 104 of the contact center operation control assistant system 100.
Figure 4B:
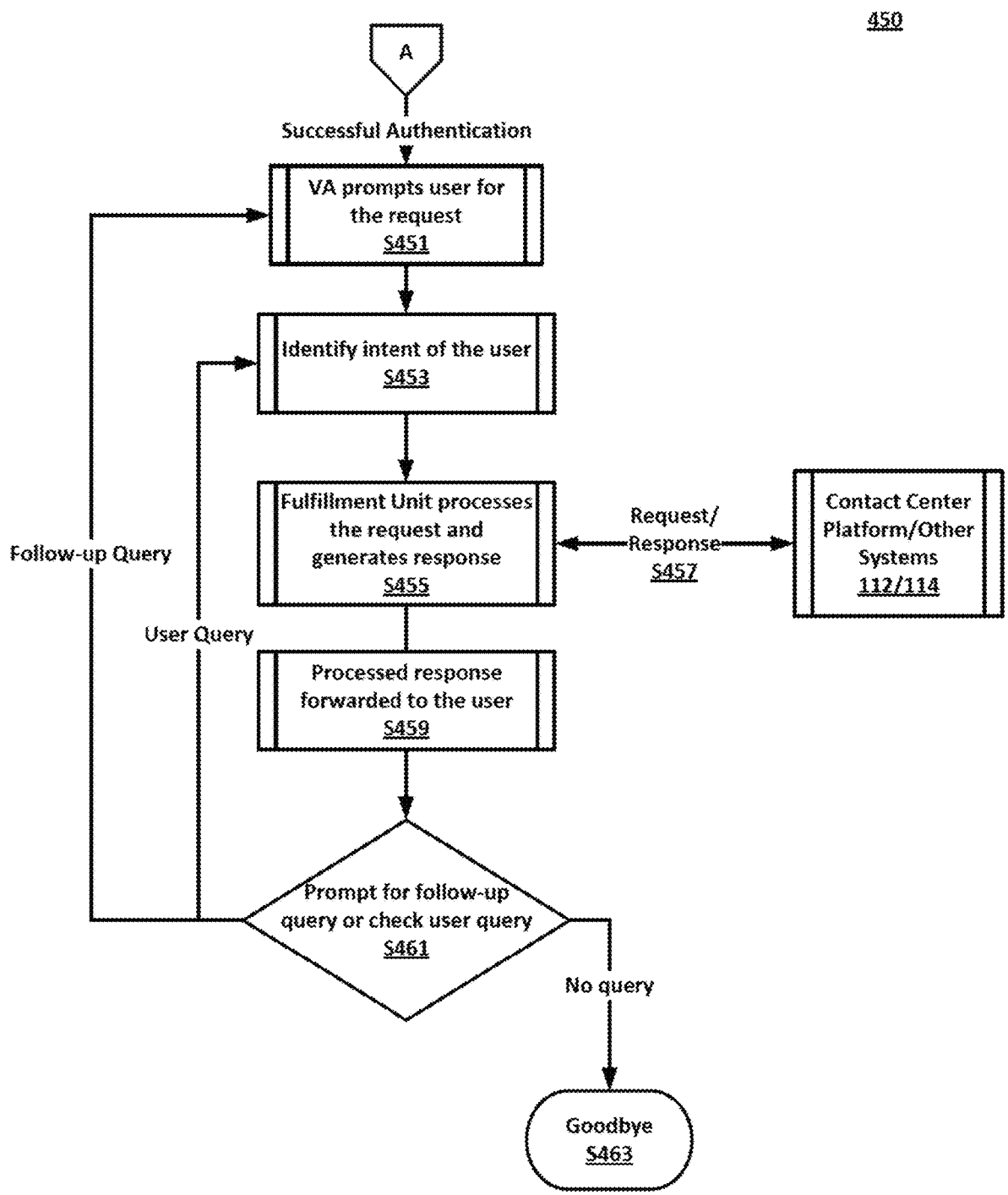
FIG. 4B illustrates an example first portion of an algorithm of the virtual assistant 104 of the contact center operation control assistant system 100.

FIGS. 4A and 4B illustrates an example algorithm of the virtual assistant 104 of the contact center operation control assistant system 100. The virtual assistant 104 may interpret the most encountered requests by leveraging its custom programming to control and interact with the contact center platform 112 including configuring, operations, training, and day-to-day management. The virtual assistant 104 may also allow for continual development of a library storing intents and recognized phrases to identify the user requests. A first portion 400 of the example algorithm is shown in FIG. 4A, where a user 116 may invoke the virtual assistant 104 using an oral greeting or command in S401, which may be captured by the smart device 102. As previously described with respect to FIG. 2B, the virtual assistant 104 may assess in S403 whether the user 116 is an authorized user. If not, the user may be denied further access to the virtual assistant 104 in S405. Otherwise, in S407, the virtual assistant 104 may greet the user and convey a second level authentication request generated by the NLU platform 106 in S409. In S411, the virtual assistant 104 may determine whether the user 116 has provided input with the requested authentication. If not, the virtual assistant 104 may continue to prompt the user 116. If so, the inputted authentication may be sent to the fulfillment unit 110 in S413. The fulfillment unit 110 may verify whether the user 116 has authenticated correctly in S415. If not, the process may return to S409. If the user 116 exceeds a maximum number of authentication attempts, the virtual assistant 104 may announce "goodbye" and prevent the user 116 from making additional attempts in S417. If so, the algorithm may proceed to the second portion 450 in FIG. 4B.

Referring now to the second portion of the algorithm 450 in FIG. 4B, once the user 116 has authenticated successfully with the fulfillment unit 110, the process may proceed to S451 where the virtual assistant 104 may prompt the user 116 for a request or query. The user 116 may orally make a request or query, which may be converted to text and passed to the NLU platform 106 as previously explained. The NLU platform 106 may identify the intent of the user 116 in S453. The identified intent may be forwarded to the fulfillment unit 110, which may process the intent in S455 by generating and transmitting a request S457 to the contact center platform 112 and/or other systems 114. The contact center platform 112 and/or other systems 114 may subsequently return a response to the fulfillment unit 110. The fulfillment unit 110 may then process the response by formatting it and/or otherwise packaging it into a user-friendly format by adding context, descriptions, labeling, and the like and delivering to the user 116 via the virtual assistant 104 and smart device 102 in S459. Upon delivery to the user 116, the virtual assistant 104 may prompt the user in S461 for a follow-up query to the previous query, in which case the algorithm 450 may return to S451. If the user 116 enters a new query, the algorithm 450 may return to S453. Otherwise, the virtual assistant 104 may cease waiting for a query in S463 until the user 116 greets the virtual assistant 104 again.

Figure 5:
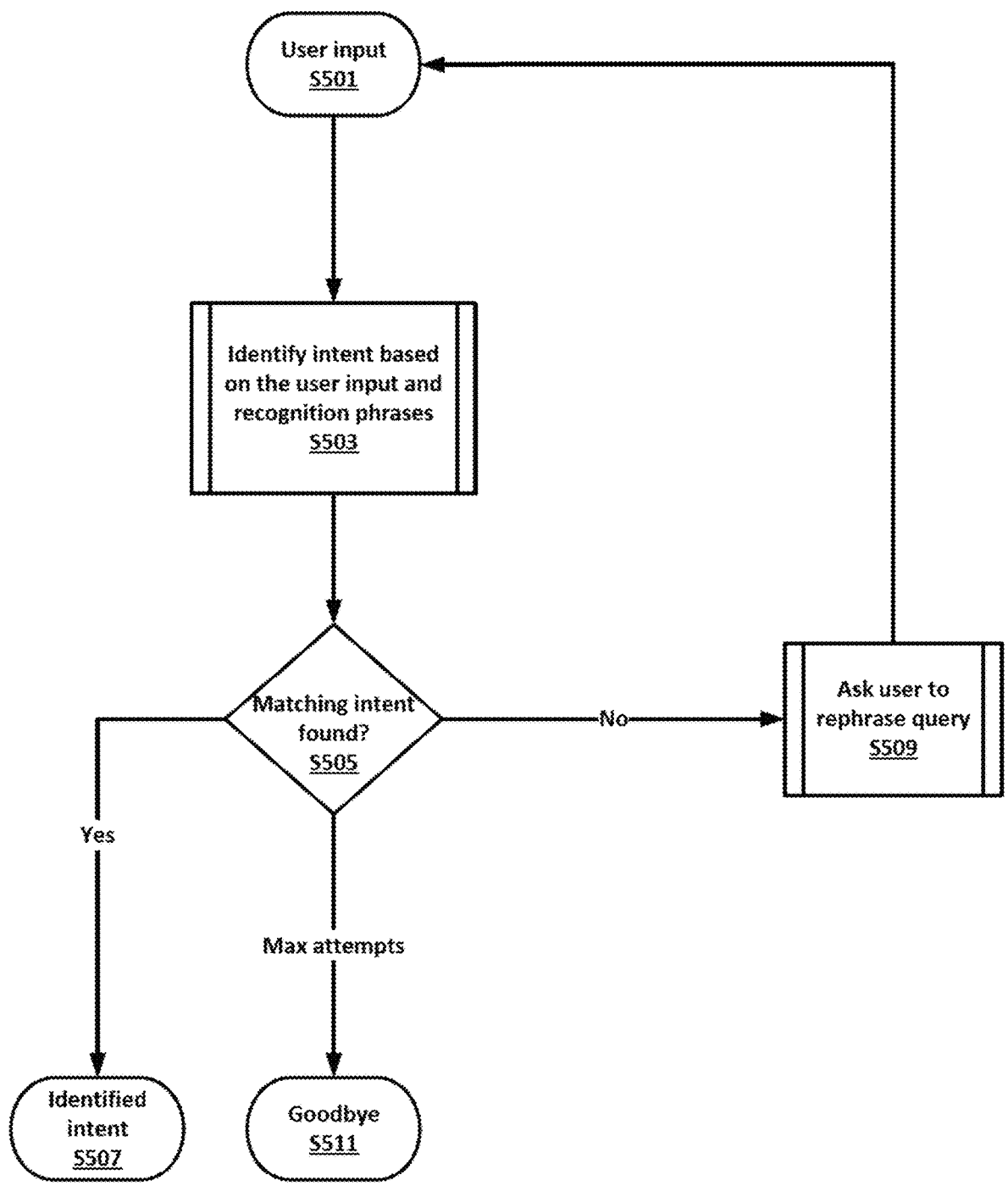
FIG. 5 illustrates an example algorithm 500 of the NLU platform 106 of the contact center operation control assistant system 100.

FIG. 5 illustrates an example algorithm 500 of the NLU platform 106 of the contact center operation control assistant system 100. As shown in FIG. 5, the NLU platform 106 may receive a user input or query that has been converted from speech to text by the virtual assistant 104 in S501. The NLU platform 106 may then employ its underlying machine learning model 108 to identify the intent in S503 by attempting to match the spoken request to a corresponding phrase stored in a contact/call center intent library. If a matching intent is found in S505, then the matched/identified intent may be forwarded to the fulfillment unit 110 as previously described in S507. If no matching intent is found in S505, the user 116 may be prompted by the virtual assistant 104 to rephrase his/her query in S509. Otherwise, if a threshold number of attempts is met, the algorithm 500 may exit in S511 until the virtual assistant 104 is greeted by the user again.

Figure 6:
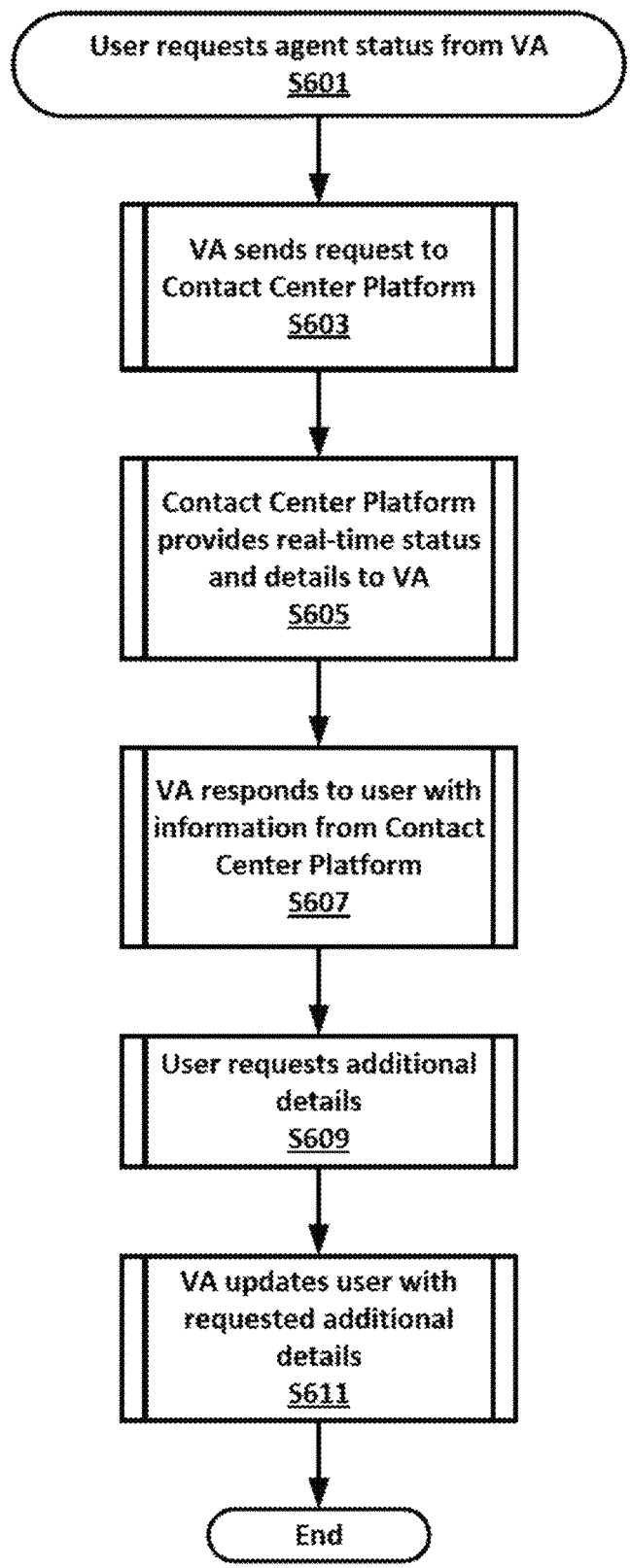
FIG. 6 illustrates an example algorithm 600 in the use case of monitoring agent status.
Figure 7:
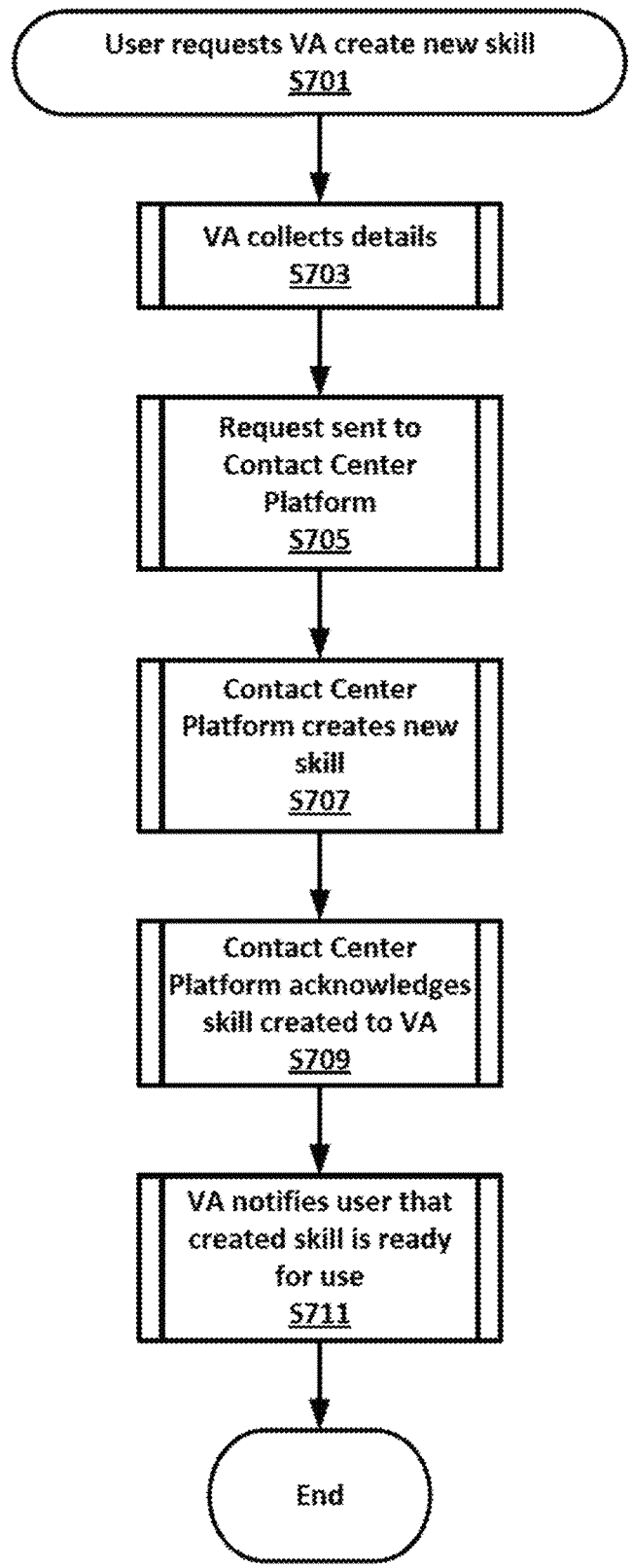
FIG. 7 illustrates an example algorithm 700 in the use case of configuring new skill for the contact center platform 112.

FIGS. 6 and 7 illustrate example use cases where the virtual assistant 104 may provide assistance with the control and operations of the contact center platform 112.

FIG. 6 illustrates an example algorithm 600 in the use case of monitoring agent status. One feature of the virtual assistant 104 is to monitor the contact center platform 112. In this scenario, a supervising user 116 may monitor the status of agents to make appropriate decision based on the outcome to control the workload and to perform any required actions to balance the interactions handling capability. The virtual assistant 104 may monitor the status of agents with additional details such as number of agents in each status, agent names and the like.

The algorithm 600 may allow supervising users to access monitoring data, quantify the data, and identify where performance may be improved. Using the virtual assistant 104 in this way may significantly reduce the time needed to login to the contact center platform 112 in a conventional manner or to use a monitoring tool and traverse through dashboards or reports, which may improve efficiency and productivity. The response provided by the virtual assistant 104 from the contact center platform 112 may be in real-time. As shown in FIG. 6, a user 116 may request agent status from the virtual assistant in S601. Upon identifying the user's intent by the NLU platform 106 as previously described, the fulfillment unit 110 may prepare and forward a request to the contact center platform 112 in S603. In response, the contact center platform 112 may provide real-=time status and additional details to the fulfillment unit 110, which may prepare and package a response to the NLU platform 106, which may convey a more natural conversational response that is suitable for audio playback to the virtual assistant 104 in S605. The virtual assistant 104 may then announce to the user 116 the prepared response including the information provided by the contact center platform 112 in S607. In S609, the user 116 may a follow-up question for additional details, which may be similarly forwarded to the contact center platform 112 as previously explained, where the virtual assistant 104 may subsequently update the user 116 with the requested details in S611.

FIG. 7 illustrates an example algorithm 700 in the use case of configuring new skill for the contact center platform 112. Configuration changes and creation of new contact center objects may be useful in a contemporary contact center environment. Business users and non-developers may find it difficult to create new objects. With the virtual assistant 104, simple oral commands may achieve tasks that may require training and specialized knowledge. For instance, the virtual assistant 104 may be configured to create a skill by performing most or all of the needed backend activities associated with creating that skill, which may be immediately employed.

Using the algorithm 700, creating configuration items and other contact center objects may be achieved hands-free, as well as other minor enhancements with little no delay. Critical changes may also be achieved quickly, thereby significantly lowering the impact time. As these tasks may be carried out with the aid of the virtual assistant 104 orally, little or no training may be required.

As shown in FIG. 7, a user 116 may request the virtual assistant 104 create a new skill in S701. The virtual assistant 104 may prompt the user 116 as needed for additional details to create the new skill in S703. The query and additional details may be provided to the NLU platform 106 as previously described to assess the user's intent and subsequently forwarded to the fulfillment unit 110. The fulfillment unit 110 may prepare and package a request to the contact center platform 112 in S705 to create the new skill. In S707, the contact center platform 112 may create the new skill and acknowledge the same to the fulfillment unit 110, which may propagate the acknowledgement to the virtual assistant 104 in S709. In S711, the virtual assistant 104 may announce to the user 116 that the new skill is ready for use.

In accordance with the present subject matter, the virtual assistant 104 may be dedicated exclusively for contact centers. The virtual assistant 104 may be connected to the internet of things leveraging AI and machine learning (ML). Call or contact centers may be controlled and operated hands-free using smart devices 102 such as wearables, smart speakers, mobile, smart TV, etc. by executing the virtual assistant 104. The virtual assistant 104 may also integrate with any contact center platform vendor. The virtual assistant 104 may support contact center platform of any model-on premise, cloud, or hybrid. The virtual assistant 104 may be coding language dependent. The fulfillment unit 110 may support multiple coding languages and scripts. The virtual assistant 104 may integrate with any virtual assistant clients. The virtual assistant 104 may be multilingual and may converse in multiple languages and achieve desired outcome for global customer base. The API-centered interfacing of the contact center operation control assistant system 100 may allow it to interface with any external systems 114. The virtual assistant 104 may be secure via multi-factor authentication and in that only users 116 authorized by the administrators may invoke the virtual assistant 104 on their smart devices 102. The capabilities and functionality of the virtual assistant 104 may be offered based on the role and permission set for each user 116, which may enhance security by providing only adequate access for each resource to get the job completed. The virtual assistant 104 may conduct smart conversations with speed and efficiency in real-time. The virtual assistant 104 may be customizable as per each business/organization to make it more personal and efficient. The virtual assistant 104 may be flexible to grow its ecosystem of supported systems since it may easily interface with any external systems through APIs. Thus, it may streamline common work activities. The virtual assistant 104 may be compatible with most of the existing cloud contact center solutions and smart speaker devices and no additional hardware costs. The virtual assistant may use machine-learning technology and may be better able to predict and understand natural-language questions and requests. The virtual assistant 104 may be easily controlled and may be scalable to support new intents and requirements. The virtual assistant 104 may easily switch between the topics or user requests and respond to complex conversations. The virtual assistant 104 may work on new topics/user-requests and at the same time work on existing ones. The virtual assistant 104 may support both voice and text conversation for smart devices. The virtual assistant 104 may allow for managing and operating the contact center remotely saving time and increasing productivity. Productivity of a contact center may be improved significantly since the virtual assistant 104 may reduce time and effort involved in accessing multiple tools and systems. The virtual assistant 104 may support audit trial of user activities and changes performed through it, which helps in the maintenance and avoid errors. Time and effort required to get skilled on different tools to manage contact center may be reduced using the virtual assistant 104. The architecture of the virtual assistant 104 may be designed to ensure maximum flexibility and adaptability to changes in application Infrastructures in organizations. User errors when creating new contact center objects or changing existing configuration items may be avoided by the virtual assistant 104 since it may ensure related and mandatory components for each item is completed. The virtual assistant 104 may provide facility of asking multiple commands in one go and have a continued conversation. The virtual assistant 104 may be pro-active, for instance, when a user 116 asks for count of agents available, the query may return asking, "Do you want to know the names of agents Available status?"

The virtual assistant 104 may be considered a one-stop solution for remotely managing and operating the contact center operations. The virtual assistant 104 may be easy to use and setup solution that leverages AI to make every contact center more efficient through intelligent guidance. The virtual assistant 104 may enable remote management of contact center thereby enabling business to achieve improved performance and million dollars of saving both in terms of time and effort. The virtual assistant 104 may be compatible with existing infrastructure and smart devices and no additional hardware costs. The virtual assistant 104 may readily interface and compliment future modern contact center technologies leveraging APIs and its micro-services architecture. The virtual assistant 104 may improves the outlook of the contact center for the business and improves brand value and employee NPS score.

Figure 8:
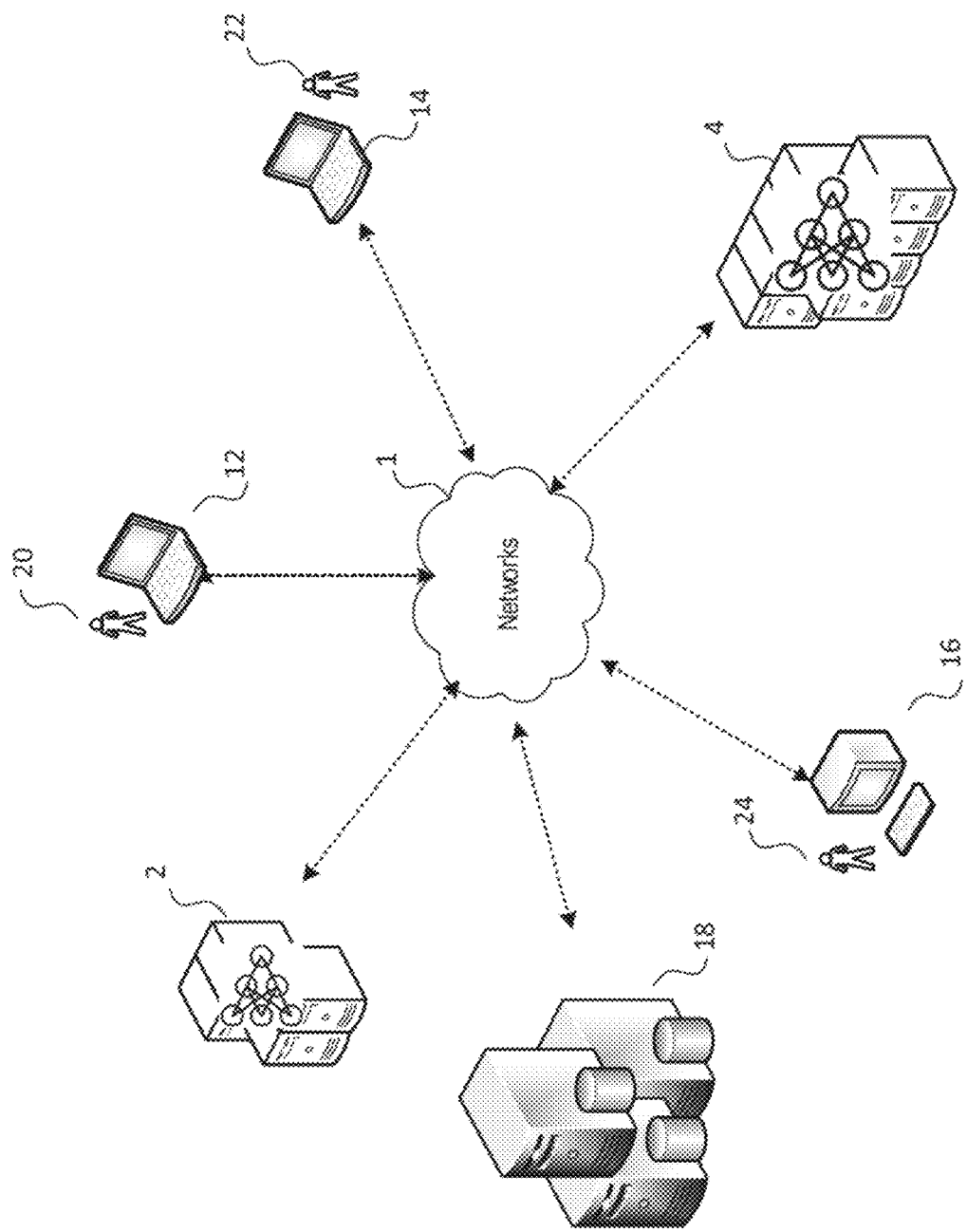
FIG. 8 illustrates an example electronic communication environment for implementing the contact center operation control assistant system.

FIG. 8 shows an example electronic communication environment 10 in which a contact center operation control assistant system may be implemented. The electronic communication environment 10 may include a portion or all the following: one or more servers 2 and 4, one or more user devices 12, 14, and 16 associated with users 20, 22, and 24, and one or more databases 18, in communication with each other via public or private communication networks 1.

The user devices 12, 14, and 16 may be any form of mobile or fixed electronic devices including but not limited to desktop personal computer, laptop computers, tablets, mobile phones, personal digital assistants, and the like.

The one or more database 18 of FIG. 8 may be hosted in a central database server, a plurality of distributed database servers, or in cloud-based database hosts. The database 18 may be organized and implemented in any form, including but not limited to document database containing text data (and/or other types of data), lists of topics, keywords, and/or entities, embedding space database containing embeddings (or embedding vectors) and relationships, and the like. The database 18 may be configured to store the intermediate data and/or final results for implementing the contact center operation control assistant system.

Figure 9:
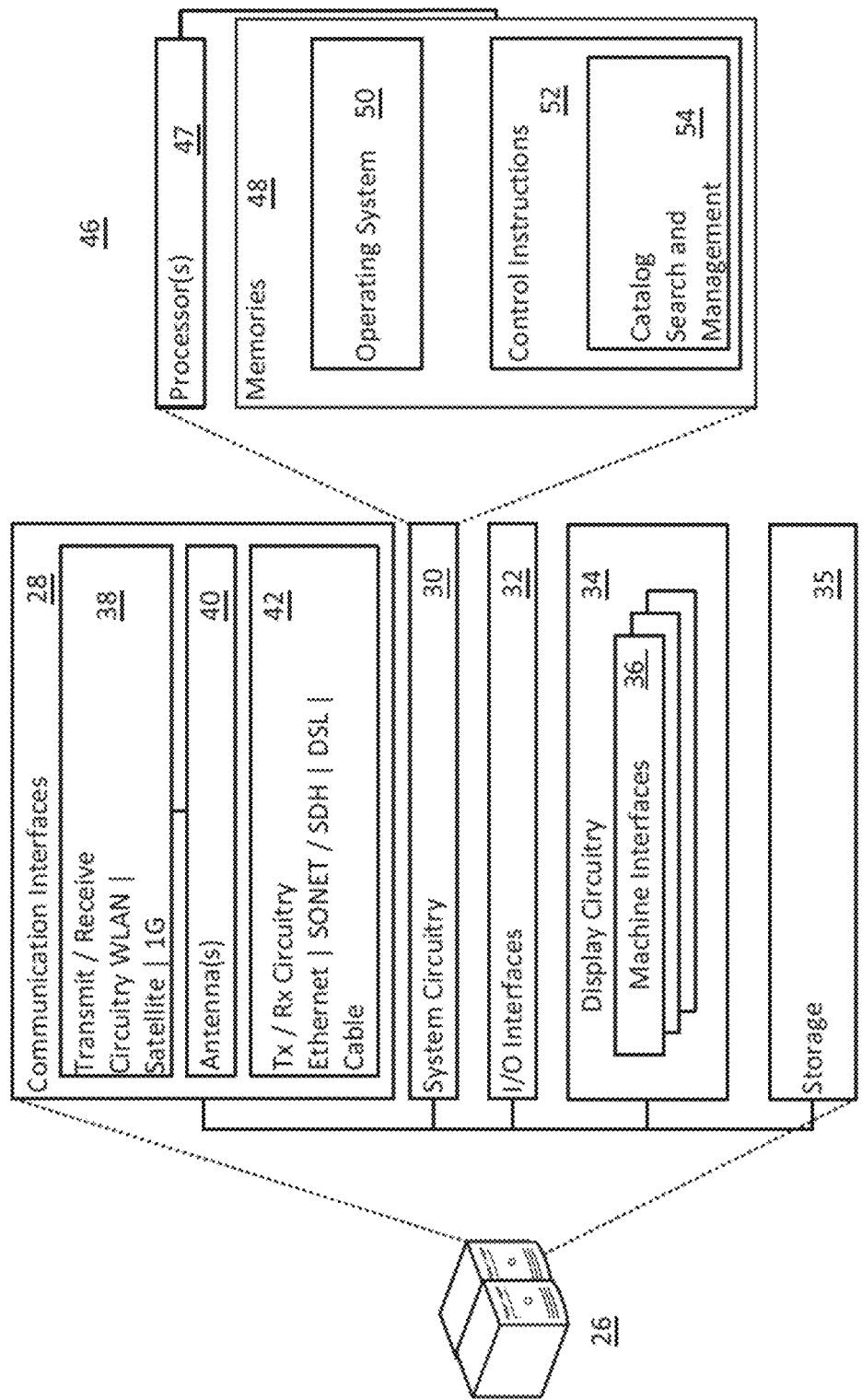
FIG. 9 illustrates computer systems that may be used to implement various components of the contact center operation control assistant system.

FIG. 9 shows an example computer system 26 for implementing the one or more servers 2 and 4, or the user devices 12, 14, and 16. The computer system 26 may include communication interfaces 28, system circuitry 30, input/output (I/O) interfaces 32, storage/memory 35, and display circuitry 34 that generates machine interfaces 36 locally or for remote display, e.g., in a web browser running on a local or remote machine. The machine interfaces 36 and the I/O interfaces 32 may include GUIs, touch sensitive displays, voice or facial recognition inputs, buttons, switches, speakers, and other user interface elements. Additional examples of the I/O interfaces 32 include microphones, video and still image cameras, headset and microphone input/output jacks, Universal Serial Bus (USB) connectors, memory card slots, and other types of inputs. The I/O interfaces 206 may further include magnetic or optical media interfaces (e.g., a CDROM or DVD drive), serial and parallel bus interfaces, and keyboard and mouse interfaces.

The communication interfaces 28 may include wireless transmitters and receivers ("transceivers") 38 and any antennas 40 used by the transmitting and receiving circuitry of the transceivers 38. The transceivers 38 and antennas 40 may support Wi-Fi network communications, for instance, under any version of IEEE 802.11, e.g., 802.11n or 802.11ac. The communication interfaces 28 may also include wireline transceivers 42. The wireline transceivers 42 may provide physical layer interfaces for any of a wide range of communication protocols, such as any type of Ethernet, data over cable service interface specification (DOCSIS), digital subscriber line (DSL), Synchronous Optical Network (SONET), or other protocol.

The storage/memory 35 may be used to store various initial, intermediate, or final data or model for implementing the contact center operation control assistant system 100. These data may alternatively be stored in the database 18 of FIG. 5. In one implementation, the storage/memory 35 of the computer system 26 may be integral with the database 18 of FIG. 5. The storage/memory 35 may be centralized or distributed, and may be local or remote to the computer system 26. For example, the storage/memory 35 may be hosted remotely by a cloud computing service provider.

The system circuitry 30 may include hardware, software, firmware, or other circuitry in any combination. The system circuitry 30 may be implemented, for example, with one or more systems on a chip (SoC), application specific integrated circuits (ASIC), microprocessors, discrete analog and digital circuits, and other circuitry.

For example, the system circuitry 30 may be implemented as 46 for the contact center operation control assistant system. The system circuitry 30 may include one or more processors 47 and memories 48. The memories 48 stores, for example, control instructions 52 and an operating system 50. The control instructions 52, for example may include instructions for implementing the components 54 of the contact center operation control assistant system 100. In one implementation, the instruction processors 47 execute the control instructions 52 and the operating system 50 to carry out any desired functionality related to the contact center operation control assistant system.

To clarify the use of and to hereby provide notice to the public, the phrases "at least one of <A>, <B>, . . . and <N>" or "at least one of <A>, <B>, . . . or <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The invention claimed is:

1. A method for operating a contact center operation control assistant system, comprising:
capturing, using a virtual assistant executing on a smart device, an oral request from a user;
identifying, using a natural language understanding (NLU) platform, an intent of the oral request;
invoking an application programming interface (API) to generate an API request to a contact center platform based on the identified intent;
receiving an API response from the contact center platform in response to the API request;
packaging the API response into a sentence;
providing, using the virtual assistant, the sentence to the user of the smart device; and
wherein the method further comprising:
determining that the intent of the oral request will cause an amount of data to be received that exceeds a threshold, and
in response to exceeding the threshold, prompting, by the virtual assistant, the user to provide additional details to reduce the amount of the data to be received.

2. The method of claim 1, wherein
the NLU platform comprises a supervised machine learning model.

3. The method of claim 1, further comprising:
capturing, using the virtual assistant, a greeting from the user;
prompting, using the virtual assistant, the user for authentication information; and
receiving, using the virtual assistant, the authentication information from the user.

4. The method of claim 3, further comprising:
forwarding the authentication information from the smart device to the NLU platform to the contact center platform.

5. The method of claim 1, further comprising:
prompting, using the virtual assistant, the user for a follow-up oral request.

6. The method of claim 1, wherein
the intent of the oral request is to create or execute a new action in the contact center platform; and
the new action is created or executed via the API request.

7. The method of claim 1, wherein identifying the intent further comprises:
matching the oral request to a phrase of a plurality of recognized phrases, wherein the plurality of recognized phrases are mapped to the intent.

8. The method of claim 1, further comprising at least one of:
converting, by the virtual assistant, the oral request to a textual request; or
converting, by the virtual assistant, the sentence to audio.

9. The method of claim 1,
wherein the API request is a first API request; and the method further comprises:
invoking the application programming interface (API) to generate a second API request to the contact center platform based on the identified intent and based on historic patterns of user behavior.

10. A contact center operation control assistant system, comprising:
a smart device configured to execute a virtual assistant and capture an oral request from a user;
an NLU platform configured to identify an intent of the oral request;
a fulfillment unit configured to:
invoke an application programming interface (API) to generate an API request to a contact center platform based on the identified intent,
receive an API response from the contact center platform in response to the API request, and
package the API response into a sentence, wherein
the smart device is further configured to provide, using the virtual assistant, the sentence to the user,
wherein the fulfillment unit is further configured to:
determine that the identified intent of the oral request will cause an amount of data to be received that exceeds a threshold, and
the virtual assistant is further configured to:
in response to the determination:
prompt the user to provide additional details to reduce the amount of the data to be received.

11. The system of claim 10, wherein
the NLU platform comprises a supervised machine learning model.

12. The system of claim 10, wherein the smart device is further configured to:
capture, using the virtual assistant, a greeting from the user;

prompt, using the virtual assistant, the user for authentication information; and receive, using the virtual assistant, the authentication information from the user.

13. The system of claim 10, wherein the fulfillment unit is further configured to:

authenticate the user based on the received authentication information by making an API call to the contact center platform.

14. The system of claim 10, wherein the smart device is further configured to:

prompt, using the virtual assistant, the user for a follow-up oral request.

15. The system of claim 10, wherein the intent of the oral request is to create or execute a new action in the contact center platform; and the new action is created or executed via the API request.

16. The system of claim 10, wherein the NLU platform is further configured to:

match the oral request to a phrase of a plurality of recognized phrases, wherein the plurality of recognized phrases are mapped to the intent.

17. The system of claim 10, wherein the smart device is further configured to, at least one of:

convert, using the virtual assistant, the oral request to a textual request; or converting, using the virtual assistant, the sentence to audio.

18. The system of claim 10, wherein the API request is a first API request; and the fulfillment unit is further configured to:

invoke the application programming interface (API) to generate a second API request to the contact center platform based on the identified intent and based on historic patterns of user behavior.

* * * * *